US005383350A

United States Patent [19]
Bennett et al.

[11] Patent Number: 5,383,350
[45] Date of Patent: Jan. 24, 1995

[54] SENSOR AND METHOD FOR DETECTING MISFIRES IN INTERNAL COMBUSTION ENGINES

[75] Inventors: David E. Bennett, Lake Lillian; Jeffrey G. Hopman, Olivia, both of Minn.

[73] Assignee: Gas Research Institute, Chicago, Ill.

[21] Appl. No.: 180,678

[22] Filed: Jan. 13, 1994

[51] Int. Cl.⁶ .................... G01M 15/00; F02P 17/00
[52] U.S. Cl. .................... 73/35; 73/117.3; 324/391; 324/402
[58] Field of Search ............ 73/116, 117.2, 117.3, 73/35 I; 324/391, 402

[56] References Cited

U.S. PATENT DOCUMENTS

| Re. 31,656 | 9/1984 | Howes | 324/391 |
|---|---|---|---|
| 2,701,335 | 2/1955 | Sargeant et al. | 324/402 |
| 2,735,296 | 2/1956 | Traver | 324/391 |
| 3,030,799 | 4/1962 | Hopkins | 73/35 I |
| 3,042,835 | 7/1962 | Badger | 324/391 |
| 3,603,872 | 9/1971 | Pelta | 324/402 |
| 4,090,125 | 3/1978 | Warner | 324/399 |
| 4,491,110 | 1/1985 | Bone et al. | 73/35 I |
| 4,601,193 | 7/1986 | Blauhut et al. | 73/35 I |
| 4,886,029 | 12/1989 | Lill et al. | 123/630 |
| 4,892,073 | 1/1990 | Yamamoto et al. | 123/630 |
| 4,969,443 | 11/1990 | De Biasi | 73/117.3 |
| 4,987,771 | 1/1991 | Iwata | 73/117.3 |
| 5,144,936 | 9/1992 | Murata et al. | 123/630 |
| 5,156,127 | 10/1992 | Ghaem | 123/630 |
| 5,159,912 | 11/1993 | Klein et al. | 123/630 |
| 5,180,983 | 1/1993 | Murata et al. | 324/402 |
| 5,201,293 | 4/1993 | Langner et al. | 123/630 |
| 5,207,200 | 5/1993 | Iwata | 73/115 |
| 5,208,540 | 5/1993 | Hoeflich | 324/388 |
| 5,208,541 | 5/1993 | Yerkovich et al. | 324/393 |
| 5,215,067 | 6/1993 | Shimasaki et al. | 123/630 |
| 5,237,280 | 8/1993 | Arnold et al. | 324/402 |
| 5,271,268 | 12/1993 | Ikeuchi et al. | 73/115 |
| 5,272,914 | 12/1993 | Murata et al. | 73/116 |

FOREIGN PATENT DOCUMENTS

| 4284174A | 10/1992 | Japan | 324/391 |
|---|---|---|---|
| 4284175A | 10/1992 | Japan | 324/391 |
| 4284176A | 10/1992 | Japan | 324/391 |
| 4284177A | 10/1992 | Japan | 324/391 |
| 4295180A | 10/1992 | Japan | 324/391 |

*Primary Examiner*—Hezron E. Williams
*Assistant Examiner*—George M. Dombroske
*Attorney, Agent, or Firm*—Hopkins & Thomas

[57] ABSTRACT

A sensor (10) detects misfires of combustion cylinders in an internal combustion engine by monitoring the exhaust from the engine. The sensor (10) comprises a spark gap (18) to be situated in exhaust from the engine and a transformer assembly (34). The transformer assembly (34) has an ignition transformer (41a) for providing a potential difference between the electrodes (18a, 18b) of the spark gap (18) and a detection transformer (41b) for sensing the occurrence of an arc across the spark gap (18). An ignition pulse shaper (68) provides an ignition pulse to the ignition transformer (41a) upon receiving a trigger signal from an engine control system (66), and a detection pulse shaper (72) monitors the detection transformer (41b) and forwards an arc detection signal to the engine control system (66) upon detecting an arc across the electrodes (18a, 18b) of the spark gap (18). Proper ignition in the internal combustion engine is presumed when the arc is generated across the electrodes (18a, 18b), and a misfire is presumed in the internal combustion engine in the absence of the arc across the spark gap (18).

30 Claims, 3 Drawing Sheets

SENSOR AND METHOD FOR DETECTING MISFIRES IN INTERNAL COMBUSTION ENGINES

FIELD OF THE INVENTION

The present invention generally relates to internal combustion engines, and more particularly, to a sensor and method for detecting misfires of engine cylinders in internal combustion engines.

BACKGROUND OF THE INVENTION

Generally, in an internal combustion engine, high voltage, or sparking voltage, is generated by an ignition coil of the engine and is sequentially distributed to spark plugs associated with engine cylinders via a distributor. The high voltage causes the spark plugs to ignite a combustible gas mixture supplied to the combustion chambers.

It is desirable in an internal combustion engine to use air-to-fuel (A/F) ratios having more air than is chemically required by stoichiometry for complete burning. When a surplus of air exists in the combustion chamber, many pollutants, such as NOx (oxides of NO), CO, and HC are effectively reduced in the exhaust emissions. Unfortunately, it is very difficult to operate an engine with a surplus of air in the combustion chamber(s) associated with the engine cylinders because the engine will exhibit poor response to transient loading on the engine. Under a particular loading condition, the A/F ratio of the engine may be adjusted for acceptable "lean burn" operation, i.e., low emissions and no misfire. However, as the load changes, the A/F ratio required to prevent misfire also changes. If the A/F ratio is too low, then excessive emissions occur. If the A/F ratio is too high, then the engine misfires.

A misfire occurs when the air/fuel mixture in a combustion chamber of one or more of the cylinders fails to burn during the power stroke. When a misfire occurs, various inconveniences result, including loss of power, increased fuel consumption, excessive vibration, excessive hydrocarbon emissions and a degradation in efficiency. Furthermore, it can also result in "after burning" of unburned fuel gas in the exhaust system of the engine. This predicament can damage a catalyst of an exhaust purifying device situated in the exhaust system. Therefore, it is essential to prevent the occurrence of a misfire in an internal combustion engine.

Some efforts of detecting an engine misfire have focused on monitoring the electronics associated with the spark plugs. As an example, U.S. Pat. No. 4,886,029 to Lill et al. describes an ignition misfire detector where the ignition signal generated by the ignition coil is monitored. The ignition signal is compared to a reference signal in order to develop a control signal, which is integrated over time and which indicates a misfire condition when it exhibits a predetermined abnormal value. As another example, U.S. Pat. No. 5,215,067 to Shimasaki et al. describes a misfire detection system for detecting a value of the sparking voltage across the spark plug and for comparing this voltage with a predetermined reference. As a further example, U.S. Pat. No. 5,201,293 to Langner et al. describes a system for detecting ignition failures by monitoring the spark voltage or spark duration.

Other efforts of detecting an engine misfire have concentrated on monitoring the chemical attributes of the exhaust gas. Under normal conditions, the exhaust gas contains NOx, CO, $CO_2$, HC, $H_2O$, $O_2$, $N_2$, and free radicals. Free radicals are gas ions that have not yet recombined to form stable molecules. The concentration of free radicals in the exhaust gas decreases as the distance from the engine exhaust valve increases. During engine misfire, the content of the exhaust changes. The exhaust after a misfire includes mostly air and fuel and only a small residual amount of combustion product gases and free radicals.

One approach for chemically monitoring engine misfire is to monitor exhaust components for sudden changes, independent of engine load and engine control parameters which can be manipulated, for instance, ignition timing, A/F ratio changes, and the like. This approach requires use of a gas analyzer for each gas component being monitored. However, use of gas analyzers is undesirable, if not impossible. First, gas analyzers are prohibitively expensive for mass use. Second, they generally require frequent maintenance. Third, they have delicate constructions and operating principles, and therefore, it would be virtually impossible to mount gas analyzers directly on an exhaust manifold. Fourth, they have slow response time. In this regard, a gas analyzer may require two seconds for generating a response, but the length of plumbing required to sample the exhaust can slow response down to over thirty seconds.

Another approach used to chemically detect misfire involves monitoring the free radicals in the exhaust. Free radicals are readily attracted by electric fields. Experiments have been conducted in which electrodes are placed in the exhaust stream. A voltage is then applied to the electrodes and the resulting current, if any, is monitored. Under normal combustion conditions, the presence of the free radicals in the exhaust is indicated by a current flow, while a misfire shows up as either a reduced current or no current. The primary problem encountered in this approach is noise. The electrodes are very susceptible to picking up electromagnetic interference (EMI). As a result, the signal-to-noise ratio of the sensor is very low. A further problem is the decreasing concentration of free radicals in the exhaust as the distance increases between the engine exhaust valve and the electrodes, as noted previously. Placement of the electrodes very close to the exhaust valve is difficult and impractical, if not impossible.

SUMMARY OF THE INVENTION

Thus, an object of the present invention is to overcome the deficiencies and inadequacies of the prior art as noted above and as generally known in the art.

Another object of the present invention is to provide a sensor and method for accurately detecting misfires in an internal combustion engine.

Another object of the present invention is to provide a sensor and method for quickly detecting misfires in an internal combustion engine.

Another object of the present invention is to provide a sensor and method for detecting misfires in an internal combustion engine without adverse effects from electromagnetic interference (EMI).

Another object of the present invention is to provide a sensor for detecting misfires in an internal combustion engine which is durable in structure, simple in design, inexpensive, and efficient in operation.

Briefly described, the present invention is a sensor and method for detecting misfires of combustion cylinders in an internal combustion engine by monitoring the exhaust from the engine. The sensor comprises a spark gap to be situated in exhaust from the engine and a transformer assembly. The transformer assembly has an ignition transformer for providing a potential difference between the electrodes of the spark gap and a detection transformer for sensing the occurrence of an arc across the spark gap. Proper ignition in the internal combustion engine is indicated by the detection transformer when an arc is generated across the electrodes, and a misfire is indicated by the detection transformer in the absence of the arc across the spark gap.

In order to interface the sensor to an engine control system, an ignition pulse shaper and a detection pulse shaper are utilized. The ignition pulse shaper provides an ignition pulse to the ignition transformer upon receiving a trigger signal from an engine control system. The detection pulse shaper monitors the detection transformer and forwards an arc detection signal to the engine control system upon detecting an arc across the electrodes of the spark gap.

An advantage of the present invention is that there is no need for significant support electronics for comparing measurements from instruments to reference values. In other words, in the invention, there is a clear indication as to whether there is a misfire or not without the need for significant logic or computational apparatus.

Another advantage of the present invention is that the sensor and method exhibit a high level of noise immunity. The magnitude of the arc current in the sensor is large and its wave shape is more easily detectable than that seen in a conventional ionization probe. As a result, it is much less susceptible to EMI.

Another advantage of the present invention is that the sensor is fast responding. A complete detection cycle may be accomplished in less than one millisecond. Several detection cycles may be run on a single exhaust stroke to roughly measure the length of the misfire gas pulse.

Another advantage of the present invention is that the sensor is durable and shock resistant and can be used in a variety of corrosive environments, including in heavy duty industrial engines and the like.

Other objects, features, and advantages of the present invention will become apparent to one of skill in the art upon examination of the following drawings and detailed description.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
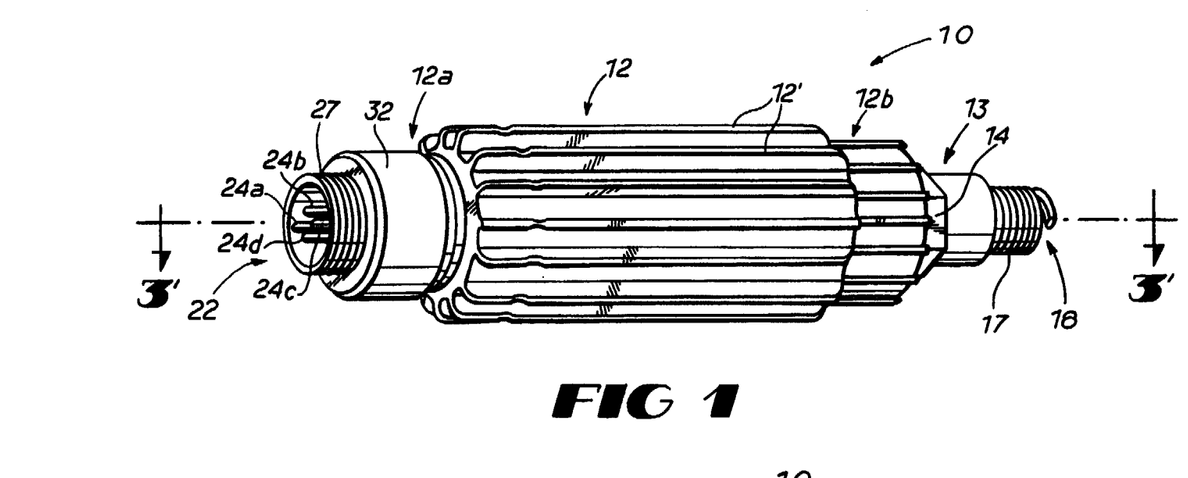
FIG. 1 is a perspective view of the sensor accordance with the present invention.
Figure 2:
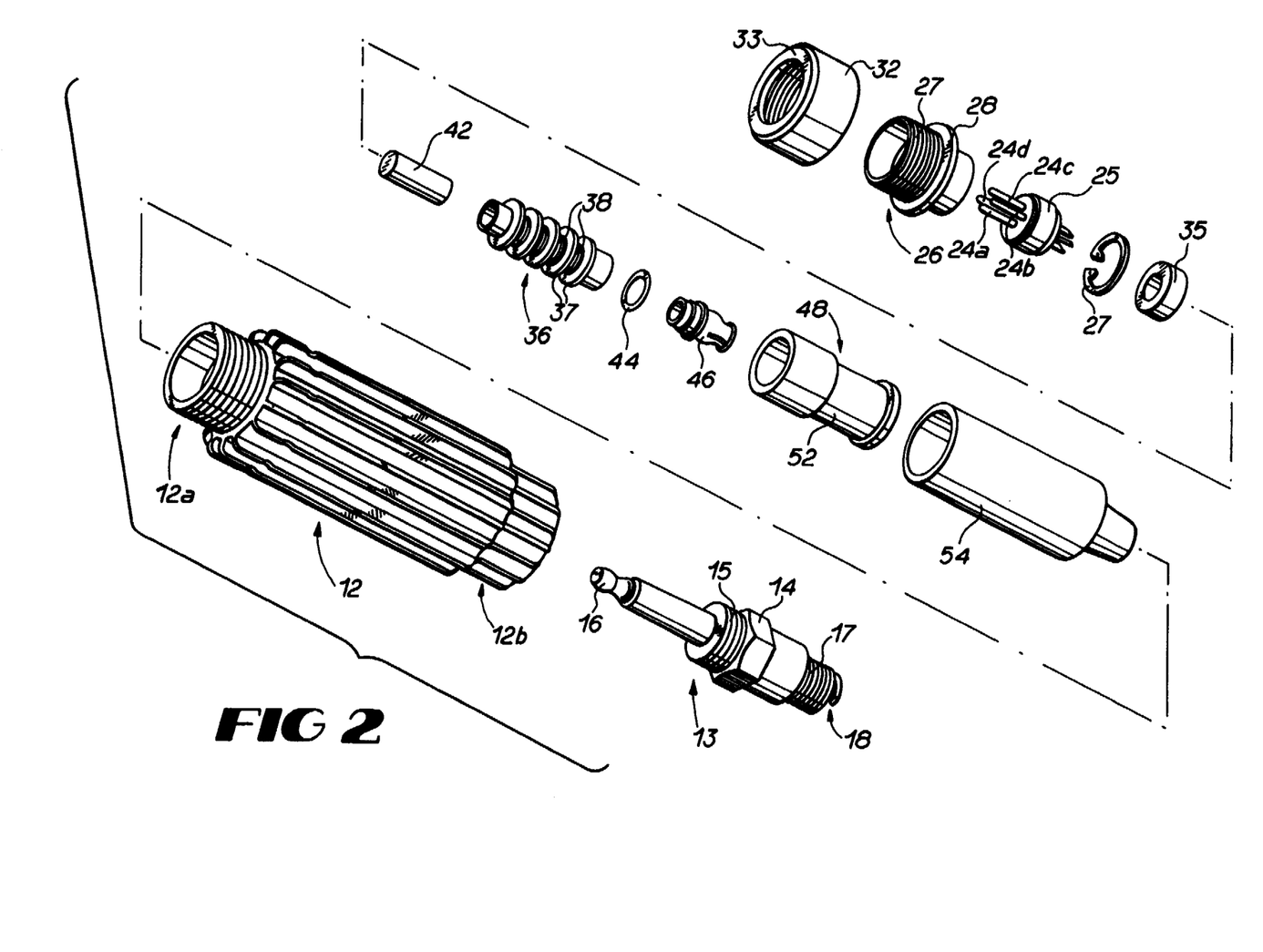
FIG. 2 is an assembly view of the sensor of FIG. 1 with electrical connections eliminated for simplicity.
Figure 3:
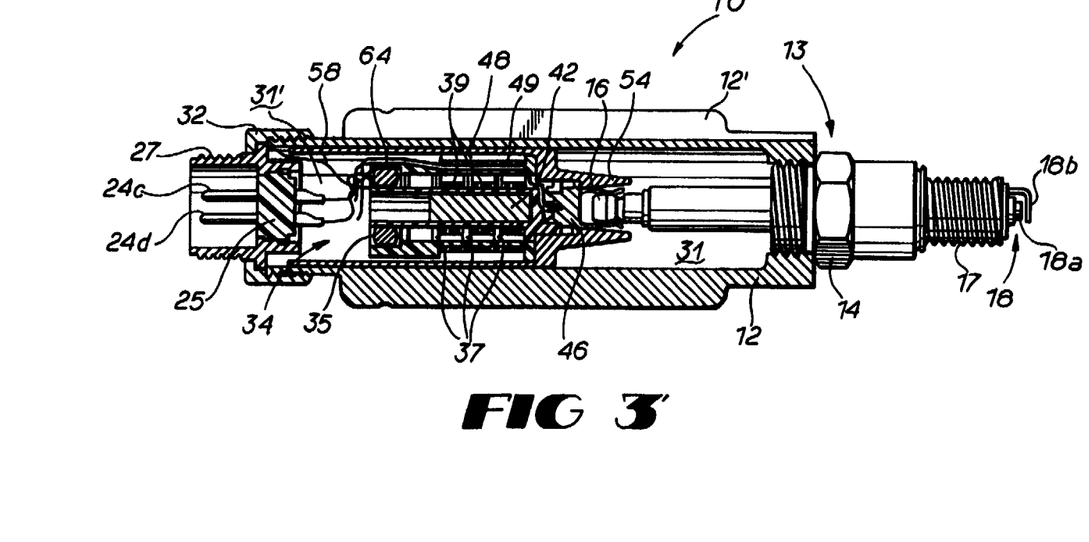
FIG. 3 is a cross-sectional view of the sensor of FIG. 1 taken along line 3'—3' of FIG. 1.
Figure 4:
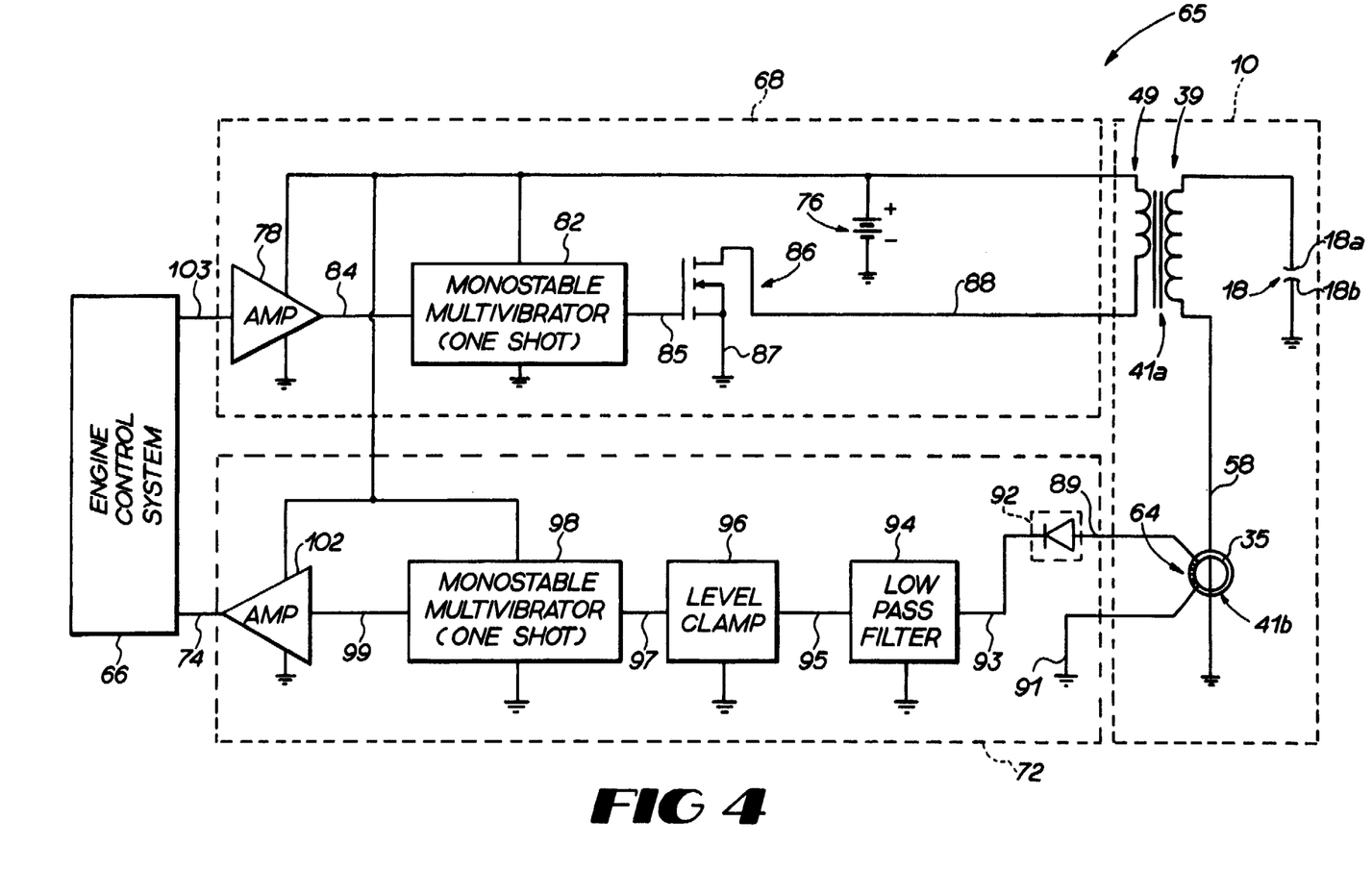
FIG. 4 is a schematic circuit diagram of the sensor of FIGS. 1 through 3 illustrating the electrical interfacing of the sensor with an engine control system.

Referring now to the drawings wherein like reference numerals designate corresponding parts throughout the several views, a sensor 10 for detecting misfires in an internal combustion engine (not shown) is illustrated in the various views of FIGS. 1 through 4. Specifically, FIGS. 1, 2, and 3 illustrate the mechanical architecture and assembly, while FIGS. 3 and 4 show the electrical interconnection of the various mechanical components and their respective functionality.

In general, the inventors have conducted extensive experimentation which shows that the dielectric properties of burned exhaust gases are different from those of unburned exhaust gases. Unlike the traditional ionization probe, which measures the conductivity of the exhaust gas, the sensor 10 measures the dielectric breakdown strength of exhaust gases. In addition to the higher conductivity of burned exhaust gases over unburned gases, burned gases have a lower dielectric strength. Therefore, in the present invention, the sensor 10 detects a misfire by applying an appropriate electric field to the gas and by subsequently checking for a breakdown. A breakdown of the gas indicates normal combustion, whereas the absence of a breakdown indicates a misfire.

The sensor 10 is preferably associated with the exhaust from a single engine cylinder in order to detect misfire of the single engine cylinder. However, the sensor 10 may be associated with the resultant exhaust from several engine cylinders collectively in order to detect that a misfire has occurred in the group of the cylinders.

As shown in FIGS. 1, 2, and 3, in the preferred embodiment, the sensor 10 comprises an elongated cylindrical housing 12 screwed onto a conventional back-threaded spark plug 14. The housing 12, preferably aluminum, has male and female threaded ends 12a, 12b respectively and a plurality of heat dissipating, radially protruding fins 12'. The spark plug 13 comprises a central nut-like body portion 14 for receiving a wrench for manipulation of the spark plug 13, back threads 15, spark plug tip 16 for receiving power, fine threads 17, and a spark gap 18 with electrodes 18a, 18b for creating a spark when a sufficient electric field is induced between electrodes 18a, 18b. The female threaded end 12b of the housing 12 receives the back threads 15 of the spark plug 13 in mating engagement. Further, the fine threads 17 of the spark plug 13 provide a means by which the sensor 10 may be mounted, such as in an exhaust manifold, in order to position the spark gap 18 within a stream of exhaust exiting from the internal combustion engine.

An electrical connector 22 is situated at the male threaded end 12a of the housing 12 for interfacing the sensor 10 to an engine control system (FIG. 4). Preferably, the electrical connector 22 is an MS (military specification)-type connector having four connector pins 24a–24d suspended in a spaced relationship within a short cylindrical connector body 25. The connector body 25 is concentrically secured within a surrounding cylindrical sleeve 26 via a generally circular snap ring 27. The sleeve 26 comprises external threads 27, an outwardly protruding annular shoulder 28, and an annular groove (not shown) for receiving the snap ring 27. Generally, the sleeve 26 receives a female electrical connector (not shown) so as to fully enclose the electrical interface to the sensor 10. Finally, the sleeve 26 is secured to the male end 12a of the housing 12 by an internally threaded cylindrical ferrule 32. Ferrule 32 has a rim 33 which rests against the annular shoulder 28 when the sensor 10 is fully assembled.

The housing 12 has an internal cavity 31 for receiving a cylindrical body 54 having a transformer assembly The transformer assembly 34 comprises an ignition transformer 41a and a detection transformer 41b, described more fully hereinafter. The transformer assembly 34 is physically situated and electrically connected between the spark plug 13 and the electrical connector 22. Moreover, the transformer assembly 34 is held together and secured within the cylindrical body 54 by introducing an epoxy potting compound into the body 54 (through a cavity 31' of the internal cavity 31) prior to placing the electrical connector 22 at the male threaded end 12a and after all electrical connections have been made within the internal cavity 31. This process will be further described hereinafter, but suffice it to say, the epoxy provides both electrical insulation and mechanical support to the elements inside the housing 12.

As best shown in FIGS. 2 and 3, the detection transformer 41b of the transformer assembly 34 structurally comprises a toroidal ferrite detection core 35 for receiving a low voltage secondary detection coil 64. The toroidal ferrite detection core 35 resides around and on an end of a high voltage secondary ignition bobbin 36, preferably made of plastic or some other suitable insulative material. The secondary ignition bobbin 36 has a plurality of outwardly protruding annular flanges 37 which are spaced apart to define a plurality of cylindrical portions 38. The cylindrical portions 38 support windings which constitute a high voltage secondary ignition coil 39. It should be noted that multiple cylindrical portions are not required. Only one is needed, but a plurality is preferred. An elongated solid cylindrical ferrite core 42 is disposed centrally through the high voltage secondary ignition bobbin 36. The ferrite core 42 enhances the magnetic coupling between the primary and secondary ignition coils 49, 39, respectively. An O-ring seal 44, preferably rubber, is situated adjacent to the secondary ignition bobbin 36 for sealing the cylindrical body 54 during epoxy potting. A spark plug clip 46 is press fitted into the end of the secondary ignition bobbin 36 adjacent the O-ring seal 44 for the purpose of receiving and electrically contacting the spark plug tip 16. A high voltage primary ignition bobbin 48 has a recessed cylindrical body portion 52 for receiving a high voltage primary ignition coil 49, and the larger cylindrical body 54 surrounds the high voltage secondary ignition bobbin 36.

The various components of the sensor 10 are electrically interconnected as follows. The secondary ignition bobbin 36 is wound with a fine magnet wire derive the secondary ignition coil 39. The spaced flanges 37 on the secondary ignition bobbin 36 separate the fine magnet wire into a plurality of transformer segments, preferably 3, in order to help relieve stress on the fine magnet wire as a result of the high voltage. One end of the fine magnet wire is soldered to the spark plug clip and the other end of the fine magnet wire is soldered to a heavier ground wire 58, which passes through the center of the toroidal secondary detection core 35 and is clamped to the housing 12 adjacent the connector 22. The heavier ground wire 58 functions as both a ground lead for the spark plug 13 and a primary winding for the toroidal secondary detection core 35.

The primary ignition bobbin 48 is wound with a heavy magnet wire to derive the primary ignition coil 49, and the primary ignition coil 49 is disposed over and magnetically coupled to the secondary ignition coil 39. The two ends of the heavy magnet wire are soldered to two pins 24a, 24b of the connector 22. Preferably, the primary ignition coil 49 has less windings than the secondary ignition coil 39, so that the arrangement acts as a step-up transformer for increasing voltage level.

The secondary detection core 35 is wound with a medium magnet wire to derive a low voltage toroidal secondary detection coil 64. The leads from the medium magnet wire from the secondary detection coil 64 are twisted together to form a twisted pair (but remain electrically unconnected) and are soldered to the pins 24c, 24d of the connector 22. The twisting of the wires prevents the configuration from becoming a loop antenna which may pick up noise from the high voltage primary.

FIG. 4 illustrates a schematic circuit diagram 65 of the sensor 10 and circuitry for interfacing the sensor 10 to an engine control system 66. The interface circuitry comprises an ignition pulse shaper 68 and a detection pulse shaper 72. In general, the pulse shapers 68, 72 provide the following functionality. The ignition pulse shaper 68 receives a trigger signal on ignition pulse shaper input 103 from the engine control system so as to commence a sampling of the exhaust. In response to the trigger signal on input 103, the ignition pulse shaper 68 outputs an ignition signal, preferably a fixed time duration pulse, to the primary ignition coil 49 for the purpose of ramping the current in the primary ignition coil 49 up to a maximum predetermined value. While the ignition signal is output by the ignition pulse shaper 68, the current in the primary ignition coil 49 ramps to a maximum value, and then the primary ignition coil 49 is open circuited. This action causes a potential difference and an electric field between the electrodes 18a, 18b of the spark gap 18. Furthermore, the detection pulse shaper 72 generally monitors current flow through the toroidal secondary detection coil 64 and produces a fixed time duration pulse on arc detection output 74 to the engine control system 66 upon sensing an arc across the spark gap 18, thereby indicating to the engine control system 66 that proper ignition has occurred in the internal combustion engine. If no arc was generated across the spark gap 18, then the detection pulse shaper 72 does not forward the fixed time duration pulse on output 74, thereby indicating to the engine control system 66 that a misfire has occurred.

Experiments concerning dielectric breakdown of burned and unburned exhaust gases have indicated that the appropriate electric field strength to be applied between the electrodes 18a, 18b of the spark gap 18 is approximately 50–300 volts per 0.001 inch. This electric field strength can be obtained by adjusting the gap between the electrodes 18a, 18b to approximately between 0.020–0.045 inch and by applying a voltage of approximately 2,000–5,000 volts across the electrodes 18a, 18b. In general, the electric field strength is equal to the potential difference across the gap 18 divided by the gap distance. It should be noted that the electric field applied across the spark gap 18 is much lower than that applied in a combustion chamber of the engine.

The ignition pulse shaper 68 comprises a power source 76, preferably a 12 volt battery, for powering its various components and for providing energy for establishing the electric field across the spark gap 18. In the preferred embodiment, the detection pulse shaper 72 is also powered by the power source 76. An amplifier 78 amplifies the trigger signal on input 103 received from the engine control system 66. The trigger signal on input 103 may be a time-varying signal and is preferably a 5 or 12 volt digital signal or pulse. The amplifier 78 enhances the voltage and current levels of the trigger signal for subsequent circuitry. A monostable multivibrator, or a one shot device, 82 is connected to the amplifier output 84. The monostable multivibrator 82 generates a fixed time duration pulse from the amplifier output 84 and passes the fixed time duration pulse to a switching mechanism 86, shown by way of example as a field effect transistor. In turn, the switching mechanism 86 switches current through the primary ignition coil 49 to ground, as indicated by reference numeral thereby forwarding an ignition signal to the primary ignition coil 49.

The detection pulse shaper 72 comprises a rectifier 92, shown by way of example as a diode, for receiving signals from the toroidal secondary detection coil 64. The rectifier 92 essentially eliminates the negative portion of the current generated in the secondary detection coil 64. A low pass filter 94 is disposed in the detector system 72 for eliminating high frequency transients which may develop in the sensor 10. A level clamp 96 ensures that the voltage amplitude of the output 95 from the low pass filter 94 remains below a predetermined level for subsequent circuitry. A monostable multivibrator, or a one shot device, 98 generates a fixed time duration pulse from the output 97 of the level clamp 96 and provides the fixed time duration pulse to an amplifier 102. The amplifier 102 processes the output 99 from the monostable multivibrator 98 so that arc detection signal 74 is forwarded to the engine control system 66 of appropriate compatibility with the engine control system 66.

The operation can be more specifically summarized as follows. At some moment during the engine exhaust stroke, the trigger signal, preferably in the form of a rising voltage pulse, is sent to the ignition pulse shaper 68 on input 103 from the engine control system 68. The ignition pulse shaper 68 receives the trigger signal and causes the lower end of the primary ignition coil 49 to be grounded via interconnects 87, 88. Because the upper end of the primary ignition coil 49 is connected to the power source 76, current flows through the primary ignition coil 49. The primary ignition coil 49 is grounded only for a time sufficient to fully charge the inductance of the primary ignition coil 49. When the primary ignition coil 49 is fully charged, the interconnect 87 to ground is broken. Because the current flow in an inductor cannot stop instantaneously, a high voltage is developed across the primary ignition coil 49. Due to the magnetic coupling between the primary and secondary ignition coils 49, 39, respectively, provided by the ferrite core 42, a voltage develops across the secondary ignition coil 39. Because there are more turns of wire on the secondary ignition coil 39 than on the primary ignition coil 49, the voltage generated on the secondary ignition coil 39 is much higher than on the primary ignition coil 49. Furthermore, the voltage developed across the secondary ignition coil 39 appears across the electrodes 18a, 18b of the spark gap 18, as the two elements are electrically in parallel.

If the electric field strength within the spark gap 18 exceeds the dielectric breakdown strength of the gas present between the electrodes 18a, 18b, an electrical arc will occur in the spark gap 18. An electrical arc comprises charged particles traveling from the negative electrode 18b to the positive electrode 18a of the spark gap 18. The charged particles form an electric current in the spark gap 18, and this electric current follows a series path which comprises the spark gap 18, the secondary ignition coil 39, and the ground wire 58. Because the ground wire 58 of the secondary ignition coil 39 passes through the center of the toroidal secondary detection core 35, the ground lead 58 is magnetically coupled to the toroidal secondary detection core 35 and functions as a single-turn primary coil for driving the toroidal secondary detection core 35. Because there are multiple windings in the secondary detection coil 64, the current generated by the secondary detection coil 64 is smaller than the current flowing through the ground wire 58, but the voltage is higher. When no electrical arc occurs across the spark gap 18, no current flows through the ground lead 58, and therefore, no voltage is developed across the windings of the toroidal secondary detection coil 64.

It should be noted that the magnetic fields of the ferrite core 42 and the toroidal secondary detection core 35 do not interact, because the geometrical arrangement of the two cores 42, 35 and their respective windings causes the magnetic fields to be at right angles. Because the magnetic fields are at right angles, one core cannot induce currents in the other core.

When an electrical arc occurs across the spark gap 18, a current is generated in the windings of the secondary detection coil 64. The detection pulse shaper 72 senses this current flow and converts the signal into an appropriate logic signal suitable for input to the engine control system 66. The time lag between the rising edge of the trigger pulse from the engine control system 66 until the detector system 72 generates the output 74 can be less than one millisecond. Hence, the sensor 10 of the present invention is fast responding. Furthermore, several sensing cycles may be run on a single exhaust stroke in order to roughly measure the length of a misfire in the internal combustion engine. This feature may be of great importance in diagnostics testing.

Many variations and modifications may be made to the preferred embodiment of the present invention as described previously without substantially departing from the principles of the present invention. All such variations and modifications are intended to be included herein within the scope of the present invention, as set forth in the following claims.

Wherefore, the following is claimed:

1. A sensor for detecting misfires in internal combustion engines, comprising:

electrodes forming a spark gap, arranged to be situated in exhaust from an internal combustion engine;

an ignition transformer having a primary ignition coil and a secondary ignition coil, said primary ignition coil for receiving power, said secondary ignition coil for applying an electric field between said electrodes in response to the power, said primary and secondary ignition coils being structured so that said electric field has a magnitude sufficient to cause an arc across said electrodes in the absence of unburned gases in the exhaust and insufficient to cause the arc in the presence of the unburned gases; and a detection transformer having a toroidal secondary detection coil arranged along and centered about an axis of said secondary ignition coils, said toroidal secondary detection coil being magnetically coupled to a circuit path comprising said electrodes, said toroidal secondary detection coil for sensing current in said circuit path and for providing an arc detection output indicative of the current;

whereby proper ignition in the internal combustion engine is indicated by said arc detection output of said detection transformer when the arc is generated across said electrodes, and a misfire is indicated by said arc detection output of said detection transformer in the absence of the arc.

2. The sensor of claim 1, wherein said sensor comprises a housing containing said ignition and detection transformers, and an electrical connector externally exposed on said housing for interfacing a control system to said transformers, and a spark gap extending from said housing and connected to said transformers.

3. The sensor of claim 2, further comprising epoxy rigidly supporting said transformers.

4. The sensor of claim 2, further comprising a cylinder spark plug mounted to said housing for providing said spark gap.

5. The sensor of claim 2, wherein said electrical connector comprises four connector pins, two of said pins leading to said ignition transformer and another two of said pins leading to said detection transformer.

6. The sensor of claim 2, wherein said housing comprises an elongated cylindrical body having fins disposed along the body and protruding radially outwardly for dissipating heat energy.

7. The sensor of claim 1, wherein said secondary ignition coil comprises a ground wire passing through the toroidal secondary detection coil and wherein said secondary detection coil senses current flowing through said ground wire.

8. The sensor of claim 1, wherein said electric field measures approximately between 50 and 300 volts per 0.001 inches.

9. The sensor of claim 1, further comprising an ignition pulse shaper interfaced to said primary ignition coil of said ignition transformer, said ignition pulse shaper having a monostable multivibrator connected to a switching mechanism, said monostable multivibrator for receiving a trigger signal from an engine control system and for generating an ignition pulse having a fixed time duration, said switching mechanism for channeling said ignition pulse to said primary ignition coil so that said primary ignition coil is charged and for permitting said primary ignition coil to discharge after charging.

10. The sensor of claim 9, further comprising a detection pulse shaper interfaced to said secondary detection coil of said detection transformer, said detection pulse shaper for converting said arc detection output to a digital signal.

11. The sensor of claim 1, further comprising:
a first ferrite core arranged along an axis of said primary and secondary ignition coils; and
a toroidal secondary detection core about which the toroidal secondary detection coil is wound, the toroidal secondary detection core being centered about the axis of said primary and secondary ignition coils but axially displaced by a predetermined amount relative to said primary and secondary ignition coils.

12. The sensor of claim 1, wherein the electrodes are arranged externally to a cylinder of the internal combustion engine.

13. A sensor for detecting misfires in internal combustion engines, comprising:

a spark gap having electrodes to be situated in exhaust from an internal combustion engine;

an ignition transformer having a primary ignition coil and a secondary ignition coil, said primary ignition coil for receiving power, said secondary ignition coil for applying an electric field between said electrodes in response to the power, said electric field having a magnitude sufficient to cause an arc across said electrodes in the absence of unburned gases in the exhaust and insufficient to cause the arc in the presence of the unburned gases in the exhaust;

a detection transformer having a toroidal secondary detection coil coupled to a circuit path comprising said electrodes, said toroidal secondary detection coil for sensing current in said circuit path and for providing an arc detection output indicative of the current;

said sensor comprising a housing containing said ignition and detection transformers, and an electrical connector externally exposed on said housing for interfacing a control system to said transformers, and a spark gap extending from said housing and connected to said transformers;

said primary ignition coil being wrapped about an elongated cylindrical primary ignition bobbin, said secondary ignition coil being wrapped about an elongated cylindrical secondary ignition bobbin, said secondary ignition coil being situated inside and concentric relative to said primary ignition coil, and further comprising a cylindrical ferrite core situated inside said secondary ignition bobbin;

whereby proper ignition in the internal combustion engine is indicated by said arc detection output of said detection transformer when the arc is generated across said electrodes, and a misfire is indicated by said arc detection output of said detection transformer in the absence of the arc.

14. A sensor for detecting misfires in internal combustion engines, comprising:

a spark gap having electrodes to be situated in exhaust from an internal combustion engine;

an ignition transformer having a primary ignition coil and a secondary ignition coil, said primary ignition coil for receiving power, said secondary ignition coil for applying electric field between said electrodes in response to the power, said electric field having a magnitude sufficient to cause an arc across said electrodes in the absence of unburned gases in the exhaust and insufficient to cause the arc in the presence of the unburned gases in the exhaust; and a detection transformer having a toroidal secondary detection coil coupled to a circuit path comprising said electrodes, said toroidal secondary detection coil for sensing current in said circuit path and for providing an arc detection output indicative of the current;

an ignition pulse shaper interfaced to said primary ignition coil of said ignition transformer, said ignition pulse shaper having a monostable multivibrator connected to a switching mechanism, said monostable multivibrator for receiving a trigger signal from an engine control system and for generating an ignition pulse having a fixed time duration, said switching mechanism for channeling said ignition pulse to said primary ignition coil so that said primary ignition coil is charged and for permitting said primary ignition coil to discharge after charging;

a detection pulse shaper interfaced to said secondary detection coil of said detection transformer, said detection pulse shaper for converting said arc detection output to a digital signal, said detection pulse shaper comprising a rectifier connected to said secondary detection coil for rectifying said arc detection output; a low pass filter connected to said rectifier for filtering said arc detection output; a level clamp connected to said low pass filter for insuring that said arc detection output remains below a predetermined amplitude; and a detection monostable multivibrator connected to said level clamp for converting said arc detection output to said digital signal;

whereby proper ignition in the internal combustion engine is indicated by said arc detection output of said detection transformer when the arc is generated across said electrodes, and a misfire is indicated by said arc detection output of said detection transformer in the absence of the arc.

15. A system for detecting misfires in internal combustion engines, comprising:

ignition means for applying an electric field to exhaust from the engine;

detection means for monitoring the exhaust within said electric field for a breakdown; and control means for determining that no misfire has occurred when the breakdown occurs and for determining that a misfire has occurred in the absence of the breakdown.

16. The system of claim 15, further comprising a spark gap within the exhaust from the engine.

17. The system of claim 15, further comprising:

a housing for containing said ignition and detection means;

an electrical connector externally exposed on said housing for interfacing said control means with said ignition and detection means; and a spark gap extending from said housing and connected to said ignition means, said detection means for monitoring current passing through said spark gap.

18. The system of claim 17, further comprising a cylinder spark plug mounted to said housing for providing said spark gap.

19. The system of claim 17, wherein said electrical connector comprises four connector pins, two of said pins leading to said ignition transformer and another two of said pins leading to said detection transformer.

20. The system of claim 17, wherein said electrical connector comprises a threaded sleeve for surrounding connector pins, said threaded sleeve for mating with a compatible threaded sleeve on another electrical connector for fully enclosing electrical connections to the system.

21. The system of claim 15, wherein said detection means comprises a toroidal coil situated about an electrical path connected to said spark gap, said toroidal coil for sensing current flowing through said electrical path and said spark gap.

22. The system of claim 15, wherein said electric field is approximately between 50 and 300 volts per 0.001 inches.

23. The system of claim 15, further comprising a spark gap having electrodes to be situated in the exhaust from said internal combustion engine;

an ignition transformer having a primary ignition coil and a secondary ignition coil, said primary ignition coil for receiving power, said secondary ignition coil for applying said electric field between said electrodes in response to the power, said electric field having a magnitude sufficient to cause an arc across said electrodes in the absence of unburned gases in the exhaust and insufficient to cause the arc in the presence of the unburned gasses; and a detection transformer having a toroidal secondary detection coil magnetically coupled to a circuit path comprising said electrodes, said toroidal secondary detection coil for sensing current in said circuit path and for providing an arc detection output indicative of the current.

24. The system of claim 23, further comprising:

an ignition pulse shaper interfaced to said primary ignition coil of said ignition transformer, said ignition pulse shaper having a monostable multivibrator connected to a switching mechanism, said monostable multivibrator for receiving a trigger signal from an engine control system and for generating an ignition pulse having a fixed time duration, said switching mechanism for channeling said ignition pulse to said primary ignition coil so that said primary ignition coil is charged and for permitting said primary ignition coil to discharge after charging; and a detection pulse shaper interfaced to said secondary detection coil of said detection transformer, said detection pulse shaper for converting said arc detection output to a digital signal.

25. The system of claim 23, wherein said primary ignition coil is wrapped about an elongated cylindrical primary ignition bobbin, wherein said secondary ignition coil is wrapped about an elongated cylindrical secondary ignition bobbin, said secondary ignition coil being situated inside and concentric relative to said primary ignition coil, and further comprising a cylindrical ferrite core situated inside said secondary ignition bobbin.

26. The system of claim 24, wherein said detection pulse shaper comprises:

a rectifier connected to said secondary detection coil for rectifying said arc detection output;

a low pass filter connected to said rectifier for filtering said arc detection output;

a level clamp connected to said low pass filter for insuring that said arc detection output remains below a predetermined amplitude; and a detection monostable multivibrator connected to said level clamp for converting said arc detection output To said digital signal.

27. The system of claim 15, wherein the ignition means applies the electric field externally to a cylinder that generated the exhaust.

28. A method for detecting misfires in an internal combustion engine, comprising the steps of:

applying an electric field to exhaust from the engine;

monitoring the exhaust in the electric field for a breakdown;

determining that no misfire has occurred when the breakdown occurs; and determining that a misfire has occurred in the absence of the breakdown.

29. The method of claim 28, further comprising the steps of:

situating a spark gap within the exhaust from the engine; and applying an electrical potential between electrodes of said spark gap.

30. The method of claim 29, further comprising the steps of sensing current flow in an electrical path comprising said spark gap in order to determine when said misfire has occurred.

* * * * *

UNITED STATES PATENT AND TRADEMARK OFFICE
CERTIFICATE OF CORRECTION

PATENT NO.   :  5,383,350
DATED        :  January 24, 1995
INVENTOR(S)  :  Bennett et al.

It is certified that error appears in the above-indentified patent and that said Letters Patent is hereby corrected as shown below:

In column 8, line 64, before "secondary" insert --primary and--.

Signed and Sealed this

Eleventh Day of April, 1995

Attest:

BRUCE LEHMAN

*Attesting Officer*           *Commissioner of Patents and Trademarks*